US010344931B2

(12) United States Patent
Winterer et al.

(10) Patent No.: US 10,344,931 B2
(45) Date of Patent: Jul. 9, 2019

(54) METHOD AND HEADLIGHT FOR GENERATING A LIGHT DISTRIBUTION ON A ROADWAY

(71) Applicant: ZKW Group GmbH, Wieselburg (AT)

(72) Inventors: Nina Winterer, Oed (AT); Bettina Reisinger, Amstetten (AT)

(73) Assignee: ZKW Group GmbH, Wieselburg (AT)

( * ) Notice: Subject to any disclaimer, the term of this patent is extended or adjusted under 35 U.S.C. 154(b) by 219 days.

(21) Appl. No.: 15/318,869

(22) PCT Filed: Jun. 22, 2015

(86) PCT No.: PCT/AT2015/050153
§ 371 (c)(1),
(2) Date: Dec. 14, 2016

(87) PCT Pub. No.: WO2015/196223
PCT Pub. Date: Dec. 30, 2015

(65) Prior Publication Data
US 2018/0045392 A1 Feb. 15, 2018

(30) Foreign Application Priority Data
Jun. 23, 2014 (AT) .............................. A 50435/2014

(51) Int. Cl.
*B60Q 1/02* (2006.01)
*F21S 41/14* (2018.01)
(Continued)

(52) U.S. Cl.
CPC ............... *F21S 41/14* (2018.01); *F21S 41/16* (2018.01); *F21S 41/663* (2018.01);
(Continued)

(58) Field of Classification Search
CPC .. F21S 41/00; F21S 41/16; F21K 9/00; F21K 9/60; F21K 9/64; F21K 9/65
See application file for complete search history.

(56) References Cited

U.S. PATENT DOCUMENTS 9,517,717 B2 12/2016 Komatsu et al.
9,702,519 B2 7/2017 Reiners
(Continued)

FOREIGN PATENT DOCUMENTS

DE 102009025678 A1 1/2010
DE 102012008833 A1 11/2012
(Continued)

OTHER PUBLICATIONS

International Search Report and Written Opinion for PCT/AT2015/050153, dated Sep. 28, 2015 (11 pages).
(Continued)

*Primary Examiner* — Thuy V Tran
(74) *Attorney, Agent, or Firm* — Eversheds Sutherland (US) LLP

(57) ABSTRACT

Systems and methods for generating light distributions on roadways with motor vehicle headlights having at least one laser light source which is modulated by an actuator and a processing unit and of which the laser beam is directed onto at least one light conversion element via a beam deflection element actuated by a beam deflection actuator, said light conversion element having a phosphor for converting light, and said headlight also comprising a projection system for projecting the light image generated at the at least one light conversion element onto the roadway, wherein in addition to changing a specified light distribution, the processing unit is configured to change the intensity of the beam of the laser light source by the actuator according to a specified function in the sense of increasing the intensity in the direction of the
(Continued)

Figure 1:
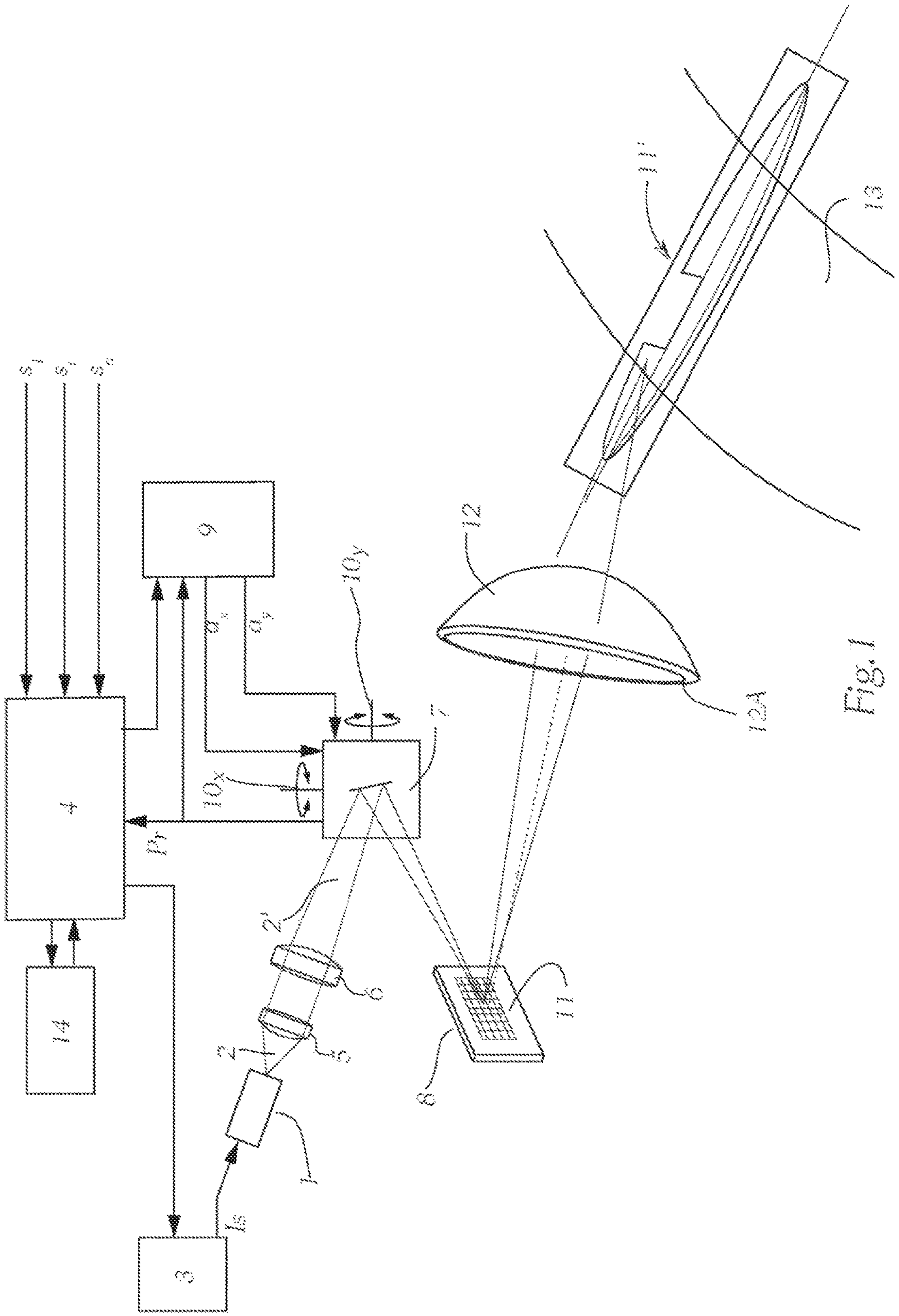

edges of the light image generated on the light conversion element.

13 Claims, 3 Drawing Sheets

(51) Int. Cl.

| | |
|---|---|
| ***F21S 41/675*** | (2018.01) |
| ***F21S 41/663*** | (2018.01) |
| ***F21S 41/16*** | (2018.01) |
| *F21K 9/60* | (2016.01) |
| *F21K 9/64* | (2016.01) |
| *F21K 9/65* | (2016.01) |

(52) U.S. Cl.
CPC ............... *F21S 41/675* (2018.01); *F21K 9/60* (2016.08); *F21K 9/64* (2016.08); *F21K 9/65* (2016.08)

(56) References Cited

U.S. PATENT DOCUMENTS

| | | | | |
|---|---|---|---|---|
| 9,777,901 | B2 | 10/2017 | Reinprecht et al. | |
| 2014/0029279 | A1* | 1/2014 | Suckling ................. | F21S 41/16 362/510 |
| 2014/0029282 | A1 | 1/2014 | Ravier et al. | |
| 2014/0204398 | A1* | 7/2014 | Sato ..................... | B60Q 1/0023 356/614 |
| 2015/0369437 | A1* | 12/2015 | Reinprecht ......... | F21S 48/1225 362/510 |
| 2016/0152173 | A1 | 6/2016 | Mayer | |

FOREIGN PATENT DOCUMENTS

| | | | |
|---|---|---|---|
| DE | 102012100141 | A1 | 7/2013 |
| EP | 2063170 | A2 | 5/2009 |
| JP | 2013-026094 | A | 2/2013 |
| WO | 2014/085896 | A1 | 6/2014 |

OTHER PUBLICATIONS

Office Action issued in Austrian Application No. A 50435/2014, dated Apr. 21, 2015 (3 pages).

* cited by examiner

METHOD AND HEADLIGHT FOR GENERATING A LIGHT DISTRIBUTION ON A ROADWAY

The invention relates to a method for generating a light distribution on a roadway with the aid of a motor vehicle headlight, in which at least one laser beam of which the intensity can be modulated is directed with the aid of at least one actuated beam deflection means onto a light conversion means in a manner scanning in at least one coordinate direction so as to generate at said light conversion means a light image which is projected with the aid of a projection optics onto the roadway.

The invention also relates to a headlight for motor vehicles having at least one laser light source which can be modulated by means of an actuator and a processing unit and of which the laser beam is directed onto at least one light conversion means via a beam deflection means actuated by a beam deflection actuator, said light conversion means having a phosphor material for converting light, and said headlight also comprising a projection system for projecting the light image generated at the at least one light conversion means onto the roadway.

The use of laser light sources in motor vehicles is currently gaining in importance, since laser diodes enable more versatile and more efficient solutions, whereby, besides new possibilities with regard to functionality, the light-emitting diodes of the light bundle and the light yields of the headlight can also be significantly increased.

In the known solutions, however, no direct laser beam is emitted so as to avoid endangering humans and other living beings as a result of the extremely bundled high-power light beam. Rather, the laser beam is conducted onto an interposed converter, which contains a luminescence conversion material, or "phosphor" for short, and is converted by this light conversion means from, for example, blue light into preferably "white" light, in particular so that a legally compliant white light impression is created in superimposition with the scattered laser radiation.

EP 2 063 170 A2 discloses a headlight for motor vehicles of the type mentioned in the introduction, in which, in order to illuminate the roadway with a dazzle-free adaptive main beam, specific areas can be omitted depending on other road users or depending on ambient parameters, such as the speed of the motor vehicle in which the headlight is installed, city/country/motorway environment, weather, twilight conditions, etc. The beam of a laser is directed via a micromirror, which can be moved in two spatial directions, onto a luminous surface, which contains a phosphor for converting the laser light into preferably white light. The light image of the luminous surface is projected into the roadway by means of a lens.

When the light image is imaged through the projection lens or another projection optics, lens errors occur, inter alia what is known as "natural illumination falloff" and "vignetting".

Natural illumination falloff is described by the $\cos^4(\alpha)$ law, which says that the image brightness towards the edge is darker by a factor $\cos^4(\alpha)$ ($\alpha$ is the angle of the beam bundle to the optical axis).

In the case of vignetting there is a shadowing of beams coming from the edge region of the light image of the light conversion means, whereby the image brightness at the edge is lower than in the middle. The severity of the loss of brightness is dependent on the used geometries, specifically the diameter of the aperture diaphragm of the lens system and/or the numerical aperture, and above all also on the radiation characteristics of the light conversion means.

Within the scope of this description of the invention, however, the term "illumination falloff" will be understood to mean any drop of intensity of the light at the edge of an image, regardless of the physical nature of its creation. The above-mentioned distinctions in theory between a "natural illumination falloff" and a darkening on account of vignetting are insignificant in practice and also in the present case.

Die DE 102009025678A1 describes a scanning mirror device and a controller for dimming an LED light source or laser light source for generating a luminance pattern. The semiconductor light source is actuated exclusively via an ON/OFF switch along the movement routes of the mirror back and forth. A fundamental control possibility is thus disclosed, but there is no mention of a variable control of the light intensity depending on the position of the scanning mirror device for the correction of imaging errors.

The object of the invention now lies in creating a method which enables a complete or at least extensive compensation of the illumination falloff. A headlight is also to be created, with which this illumination falloff is at least largely offset.

This object is achieved with a method of the type specified in the introduction, in which, in accordance with the invention, in order to correct the illumination falloff, the intensity of the at least one laser beam is changed according to a specified function in the sense of increasing the intensity in the direction of the edges of the light image generated on the light conversion means.

In an advantageous variant, provision is made so that the intensity of the at least one laser beam is multiplied by coordinate-dependent correction factors ($\delta$, $\varepsilon$, $\nu$).

Here, it can also be expedient when, in order to correct the illumination falloff according to the $\cos^4 \alpha$ law, the intensity of the at least one laser beam is multiplied by the reciprocal of a correction factor $\delta(x, y)$, wherein $$\delta(x, y) = \cos^4(\alpha) = \left(\frac{g^2}{x^2 + y^2 + g^2}\right)^2,$$

with $x(t)=A\cdot\sin(\omega_x t)$ and $y(t)=B\cdot\sin(\omega_y t)$, g is optical distance between phosphor and projection optics, A, B are amplitudes of the mirror vibrations, and $\omega_x$, $\omega_y$ are the frequencies thereof in the coordinate directions x, y.

On the other hand, it can also be advantageous if, in order to correct the illumination falloff on account of the vignetting, a correction factor $\varepsilon(x,y)=\sin^2(\theta_0/2)/\sin^2(\theta(x,y)/2)$ is used, with point coordinates (x,y) in relation to the optical axis.

In expedient variants provision can be made so that the change in intensity for correction of the illumination falloff is performed at least in the horizontal direction x.

In a further recommended variant provision is made so that the beam deflection means has at least one micromirror, which can be pivoted about at least one axis, and a laser light source, which generates at least one light beam depending on the angular position of the at least one micromirror.

In this case it is expedient when the micromirror is actuated with a frequency corresponding to a mechanical inherent frequency in the corresponding coordinate direction.

The stated problem is also achieved with a headlight of the above-mentioned type, in which, in accordance with the invention, in addition to changing a specified light distribution, the processing unit is configured to change the intensity of the beam of the laser light source by means of the actuator according to a specified function in the sense of increasing the intensity in the direction of the edges of the light image generated on the light conversion means.

Here, It can be advantageous when the processing unit is configured by the actuator for multiplication of the actuation current and therefore the laser beam intensity by coordinate-dependent correction factors.

Furthermore, it is expedient if, for correction of the illumination falloff according to the $\cos^4 \alpha$ law, the processing unit is configured to multiply the intensity of the at least one laser beam by the reciprocal of a correction factor $\delta(x, y)$, wherein $$\delta(x, y) = \cos^4(\alpha) = \left(\frac{g^2}{x^2 + y^2 + g^2}\right)^2,$$

with $x(t)=A\cdot\sin(\omega_x t)$ and $y(t)=B\cdot\sin(\omega_y t)$, g is optical distance between phosphor and projection optics, A, B are amplitudes of the mirror vibrations, and $\omega_x$, $\omega_y$ are the frequencies thereof in the coordinate directions x.

On the other hand, provision is made advantageously so that, for correction of the illumination falloff on account of the vignetting, the processing unit is configured to multiply the intensity of the at least one laser beam by a correction factor $\varepsilon(x,y)=\sin^2(\theta_0/2)/\sin^2(\theta(x,y)/2)$, with point coordinates (x,y) in relation to the optical axis.

In an expedient variant, provision can be made so that the beam deflection means has at least one micromirror, which can be pivoted about an axis, and a position signal relating to the angular position of the mirror is fed to the processing unit in order to modulate the laser light source, which generates the at least one light beam, depending on the angular position of the at least one micromirror.

Here, It is recommended when the beam deflection actuator is designed to output at least one driver signal to the at least one micromirror, of which the frequency corresponds to the mechanical inherent frequency of the micromirror in the corresponding coordinate direction.

Figure 2A:
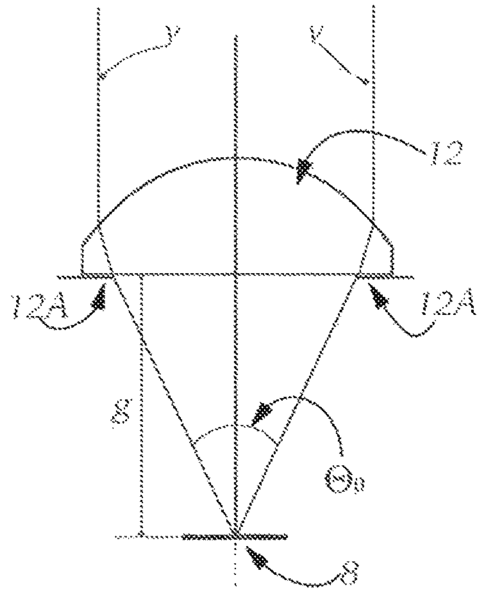
Figure 2B:
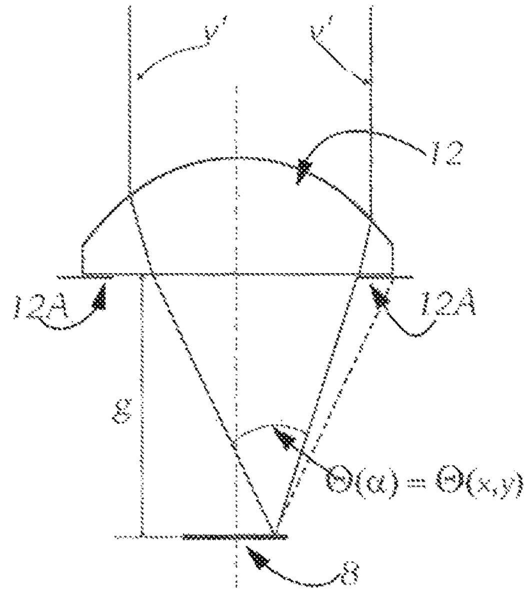
Figure 2C:
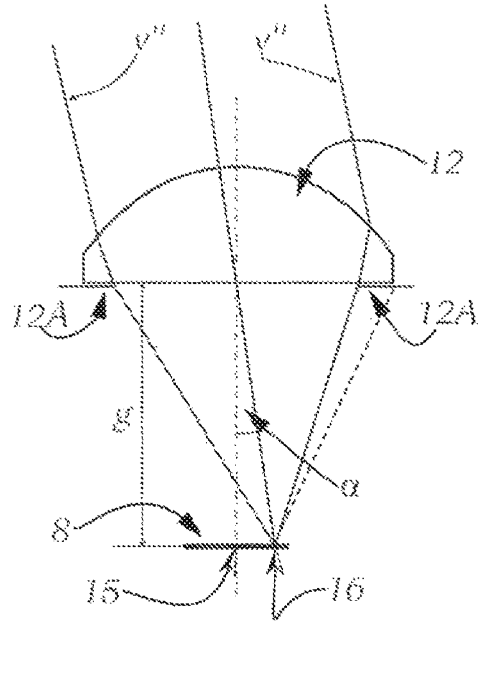
Figure 3:
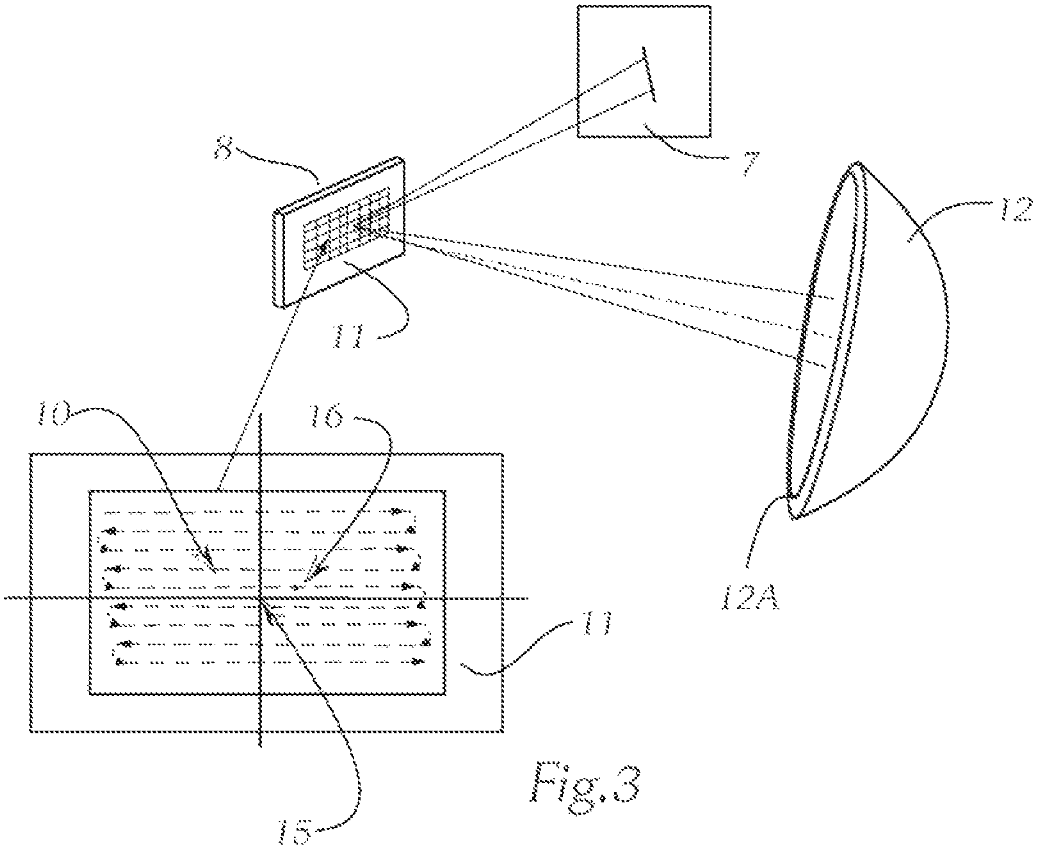

The invention together with further advantages is explained in greater detail hereinafter on the basis of exemplary embodiments which are illustrated in the drawings, in which FIG. 1 shows the components of a headlight essential to the invention and the relationships therebetween in a schematic illustration, FIGS. 2*a*, 2*b* and 2*c* schematically show the course of the beam and the edge beams with projection of a light image generated on a phosphor, and FIG. 3 schematically shows, similarly to FIG. 1, an exemplary scanning path over the phosphor of a light conversion means.

With reference to FIG. 1 an exemplary embodiment of the invention will now be explained in greater detail. In particular, the parts important for a headlight according to the invention are illustrated, wherein it is clear that a motor vehicle headlight also contains many other parts which enable appropriate use of said headlight in a motor vehicle, in particular such as a car vehicle or motorbike. In terms of light, the starting point of the headlight is a laser light source 1, which outputs a laser beam 2, and which is assigned a laser actuator 3, wherein this actuator 3 serves to supply power to and also to monitor the laser emission or, for example, serves for temperature control and also is configured to modulate the intensity of the irradiated laser beam.

The term "modulate" is to be understood in conjunction with the present invention to mean that the intensity of the laser light source can be changed, whether continuously or in a pulsed manner, in the sense of a switching on and off. It is essential that the light output can be dynamically changed analogously, depending on the angular position of a mirror described in greater detail further below. In addition, there is also the possibility to switch the laser light on and off for a certain period of time so as not to illuminate or so as to mask out defined areas. An example of a dynamic actuation concept for generating an image by a scanning laser beam is described for example in Austrian patent application A 50454/2013 in the name of the applicant, dated 16 Jul. 2013.

The laser light source in practice often contains a plurality of laser diodes, by way of example six, for example each being 1 watt, so as to achieve the desired output or the required luminous flux. The actuation current of the laser light source 1 is denoted by $I_s$.

The laser actuator 3 in turn receives signals from a central processing unit 4, to which sensor signals $s_1 \ldots s_i \ldots s_n$ can be fed. These signals can be switch commands for switching from main beam to dipped beam for example, or can be signals which for example are recorded by sensors $S_1 \ldots S_n$, such as cameras, which detect the illumination conditions, ambient conditions and/or objects on the roadway. The signals can also originate from vehicle-vehicle communication information.

The laser light source 1 for example outputs blue or UV light, wherein the laser light source is arranged upstream of a collimator optics 5 and a focusing optics 6. The design of the optics is dependent, inter alia, on the type, number, and spatial placement of the used laser diodes, on the necessary beam quality, and on the desired laser spot size at the light conversion means.

The focused and/or shaped laser beam 2' contacts a micromirror 7 and is reflected onto a light conversion means 8, which in the present example is formed as a luminous surface and which for example, as is known, comprises a phosphor for light conversion. The phosphor by way of example converts blue or UV light into "white" light. In conjunction with the present invention, a "phosphor" is understood generally to mean a substance or a substance mixture which converts light of one wavelength into light of another wavelength or a wavelength mixture, in particular into "white" light, which can be subsumed from the expression "wavelength conversion".

Luminescence dyes are used, wherein the starting wavelength is generally shorter and therefore more energy-rich than the emitted wavelength mixture. The desired white light impression is created here by additive colour mixing. Here, "white light" is understood to mean light of a spectral composition which gives humans the impression of the colour "white". The term "light" is of course not limited to radiation visible to the human eye. For the light conversion means, optoceramics are considered for example, that is to say transparent ceramics, such as YAG:Ce (an yttrium aluminium garnet doped with cerium).

It should be noted at this juncture that in the drawing the light conversion means is shown as a phosphor surface, on which the scanning laser beam or scanning laser beams generate an image which is projected starting from this side of the phosphor. However, it is also possible to use a translucent phosphor, with which the laser beam, coming from the side facing away from the projection lens, generates an image, wherein, however, the irradiation side is disposed on the side of the light conversion means facing towards the projection lens. Thus, both reflective and transmissive beam paths are possible, wherein, ultimately, a mixture of reflective and transmissive beam paths is not ruled out either.

The micromirror 7 vibrating in the present example about two axes is actuated by a deflection actuator 9 with the aid of driver signals $a_x$, $a_y$ and for example is made to vibrate in two directions x,y orthogonal to one another at constant frequency, but in many cases at different frequency in the x-direction and y-direction, wherein these vibrations in particular can correspond to the mechanical inherent frequencies of the micromirror in the corresponding axes. In the case of electrostatically working micromirrors, relatively high driver voltages in the order of 150 volts are necessary. The deflection actuator 9 is also controlled by the processing unit 4 so as to be able to adjust the vibration amplitudes of the micromirror 7, wherein asymmetrical vibrations about the corresponding axis can also be set. The actuation of micromirrors is known and can be performed in many ways, for example electrostatically or electrodynamically. In the case of tested embodiments of the invention, the micromirror 7 for example vibrates with a frequency of 20 kHz in the x-direction about a first vibration axis 10*x* and with a frequency of 400 Hz in the y-direction about a second vibration axis 10*y* and its maximum swing leads, depending on its actuation, to deviations in the resultant light image of, for example, +/−35° in the x-direction and −12° to +6° in the y-direction, wherein the mirror deflections are half of these values. Embodiments are also possible in which the vibration frequencies in both coordinate directions are the same.

The position of the micromirror 7 is expediently communicated with the aid of a position signal $p_r$ to the deflection actuator 9 and/or to the processing unit 4. It should be noted that other beam deflection means, such as movable prisms, can also be used, although the use of a micromirror is preferred.

The laser beam 6 thus scans a light image 11 having a specified light distribution over the light conversion means 8, which is generally flat, but does not have to be flat. This light image 11 is then projected with a projection system 12 as light image 11' onto the roadway 13. Here, the laser light source is actuated with high frequency in a pulsed manner or continuously, such that any light distributions not only can be adjusted—for example main beam/dipped beam—but also can be quickly changed in accordance with the position of the micromirror, when this is required on account of a particular terrain or roadway situation, for example when pedestrians or oncoming vehicles are detected by one or more of the sensors $S_1 \ldots S_n$ and accordingly it is desired to change the geometry and/or intensity of the light image 11' of the roadway illumination. The projection system 12 is illustrated here in a simplified manner as a lens, wherein a delimiting aperture is denoted by 12A, which for example could be the delimitation of a lens holder.

The term "roadway" is used here for simplified representation, since of course it is dependent on the local conditions as to whether the light image 11' is actually disposed on the roadway or also extends beyond the roadway. In principle, the image 11' corresponds to a projection on a vertical surface corresponding to the relevant standards relating to motor-vehicle illumination technology.

As already mentioned in the introduction, a decrease in brightness is produced in the projected image on account of flawed projection systems, this being a nuisance that is inherent to all optical systems and is well known in photography.

In order to successfully remedy the problem of illumination falloff explained in the introduction, it is now provided, in order to correct the illumination falloff, in addition to changing the above-discussed light distribution, to change the intensity of the laser beam 2 according to a specified function in the sense of increasing the intensity in the direction of the edges of the light image 11 generated on the light conversion means 8.

The $\cos^4(\alpha)$ law describes what is known as "natural illumination falloff", which has already been mentioned in the introduction, whereby the image brightness towards the edge is darker by a factor $\cos^4(\alpha)$ ($\alpha$ is the angle to the optical axis). Thus, the image brightness $I(\alpha)$ in an angle $\alpha$ outside the center of the image is $I(\alpha)=I_0\cdot\cos^4(\alpha)$, wherein $I_0$ is the brightness in the middle of the image.

In FIGS. 2*a*, 2*b* and 2*c* the geometric situation which leads to vignetting is illustrated in a simplified manner, wherein reference sign 8 denotes the light conversion means, 12 denotes the lens, which represents the projection optics, wherein $\theta_0$ is the maximum angle of aperture of the beam bundle that passes through the entrance pupil of the imaging lens. It describes the accepted beam bundle from an object point to the side of the optical axis. Such a beam bundle is assigned an angle of aperture $\theta(\alpha)$, which is dependent on the angle of deflection $\alpha$.

The beams v represent the edge beams in the center that are just short of being vignetted; thus, a maximum usable numerical aperture is defined by the angle of aperture $\theta_0$. If the laser beam now meets beam bundles at a point 16 placed to the side of the optical axis, another beam bundle $\theta(x,y)$ is projected through the limiting, i.e. vignetting diaphragm 12A by the projection system, for example a lens, onto the road. In order to emphasize the difference of this different beam bundle, the edge beams associated with the point 16 are denoted by v'. The usable luminous flux is reduced by the edge beams v', and this is compensated for by the correction in the present case.

Each vignetted beam bundle, starting from a deflection point (x, y) on the phosphor of the light conversion means 8, has beam bundle widths of different size in the x- and y-direction towards the entrance aperture of the imaging lens 12. The assigned angles along these orthogonal directions are calculated via the known focal length of the imaging lens: the angle of aperture $\theta(\alpha)=\theta(x,y)$ can be represented in a first approximation as the arithmetic mean of these two angle values. Such an averaging is used for example in the laser classification of elliptical laser spots.

In the case of vignetting there is a shadowing of beams coming from the edge region of the light image of the light conversion means, whereby the image brightness at the edge is lower than in the middle. The severity of the loss of brightness is dependent on the used geometries and above all also on the irradiation characteristics of the light conversion means.

In order to offset the illumination falloff on account of the vignetting, a correction factor $\varepsilon$ is used, for example:

$$\varepsilon(x,y)=\Phi_{max}/\Phi(x,y)=(I\pi n^2\sin^2(x,y))/(I\pi n^2\sin^2(\theta(\alpha)))=(\sin^2(\theta_0))/(\sin^2(\theta(x,y)))$$

wherein I is the luminous intensity at the point (x,y), and n is the refractive index of the propagation medium.

In FIG. 2*c* the effect of the $\cos^4(\alpha)$ law is illustrated in a simplified manner. The law describes the attenuation towards the edge of the image field, caused by the perspective distortion of the entrance pupil, and has long been known to a person skilled in the art. The effects of this effect on the projected light image are compensated for by the correction in the present case. In order to offset the natural illumination falloff, a correction factor δ can be used, wherein the intensity of the laser beam is multiplied by the reciprocal of a correction factor δ(x, y), wherein $$\delta(x, y) = \cos^4(\alpha) = \left(\frac{g^2}{x^2 + y^2 + g^2}\right)^2,$$

with $x(t)=A\cdot\sin(\omega_x t)$ and $y(t)=B\cdot\sin(\omega_y t)$, g is optical distance between phosphor and projection optics, A, B are amplitudes of the mirror vibrations, and $\omega_x$, $\omega_y$ are the frequencies thereof in the coordinate directions x, y. In practice, the supply current of the laser light source 1 is corrected with the two correction factors ε(x,y) and δ(x,y), which leads to accordingly adapted correction factors.

In FIG. 3, for improved illustration, a sampling process has been shown by way of example, wherein the starting point is the illustration according to FIG. 1. In the enlarged illustration of the light image 11 on the phosphor of the light conversion means 8, it is possible to see the scanning line by line, wherein 15 denotes the point of origin in respect of the coordinates x and y, specifically the point of intersection of the optical axis of the projection system 12 with the plane of the light conversion means on which the phosphor is disposed, and 16 denotes a general point with the coordinates (x, y), specifically the particular point of impingement of the laser beam for which the relationship $$\tan(\alpha) = \frac{\sqrt{x^2 + y^2}}{g}$$

applies.

When each laser diode in the laser light source can be actuated individually, the differently assigned points of impingement can also be modulated, in each case with adapted correction factors. Generally, the intensity of the laser beam is varied by the modulation of the actuation current $I_s$ by multiplying the actuation current by the location-correlated correction factors.

As discussed above, the origin of the illumination falloff is of rather subordinate importance for compensation of this illumination falloff. In practice, such correction values γ are determined empirically, the correlations are stored in tables, and these values are made available in a memory 14 to the processing unit, which, together with other information, can contain these correction values or correction tables for correction of the illumination falloff.

The empirically determined effects of the actual irradiation characteristics of the phosphor, for example due to the selected geometry of the phosphor, on density fluctuations in the doping could equally be taken into consideration by corresponding correction values.

In another variant the entire system is divided into two laser beam generation units of identical structure and two micromirrors are provided, which each vibrate in two coordinate directions. One laser unit is positioned for example above the optical axis of the imaging lens, and the second laser unit is positioned below the optical axis of the imaging lens. On account of this mirrored arrangement, the coordination of the corresponding mirror actuator is simplified, because only the change of sign has to be taken into consideration, wherein such an embodiment increases the laser output on the phosphor.

Although preferred exemplary embodiments of micromirrors which vibrate about two axes have been presented, it is also possible to use two micromirrors, one of which vibrates about an axis A and the other of which vibrates about an axis B. The first micromirror is assigned a laser light source and generates a light image pattern that can be scanned one-dimensionally, for example a horizontally running line image. The second micromirror vibrates about an axis B, which is oriented orthogonally to the axis A, and shifts the line produced by the first mirror at right angles to the extent of this line, such that a complete light image that can be changed two-dimensionally is produced on the light conversion means. This can bring an advantage in respect of the output distribution over two micromirrors, but problems can be encountered here with regard to the adjustment of the two half-systems. In this case, a number of offset-adjusted laser beams can be directed towards a micromirror of this type, which then generates overlapping or directly adjacent light bands. Embodiments having just one single micromirror are also conceivable, in which for example the laser beams contact the micromirror directly, against the primary irradiation direction of the headlight, said micromirror then deflecting the laser beams onto a phosphor, through which light is passed through. The division into two groups of laser light sources and the use of two micromirrors, however, brings advantages in respect of a compact construction and a heat dissipation that can be managed well, especially since the possible thermal load of a micromirror is limited.

The invention claimed is:

1. A method for generating a light distribution on a roadway (13) with a motor vehicle headlight, in which at least one laser beam (2) of which an intensity is configured to be modulated is directed with at least one actuated beam deflection element (7) onto a light conversion element (8) in a manner scanning in at least one coordinate direction so as to generate at the light conversion element a light image (11) which has light distributions and which is projected with a projection optics (12) onto the roadway, the method comprising:

changing, in order to correct an illumination falloff, the intensity of the at least one laser beam (2) according to a specified function for increasing the intensity in a direction of edges of the light image (11) generated on the light conversion element (8).

2. The method of claim 1, wherein the intensity of the at least one laser beam (2) is multiplied by coordinate-dependent correction factors comprising δ(x, y) or ε(x, y) in order to correct the illumination falloff, wherein x and y comprise coordinate directions.

3. The method of claim 1, wherein in order to correct the illumination falloff, the intensity of the at least one laser beam is multiplied by a reciprocal of a coordinate-dependent correction factor δ(x, y), wherein x and y comprise coordinate directions.

4. The method of claim 1, wherein in order to correct the illumination falloff on account of vignetting, the intensity of the at least one laser beam (2) is multiplied by a coordinate-dependent correction factor ε(x,y), wherein x and y comprise coordinate directions.

5. The method of claim 1, wherein a change in the intensity for correction of the illumination falloff is performed at least in a horizontal direction.

6. The method of claim 1, wherein the at least one actuated beam deflection element has at least one micromirror (7), which is configured to be pivoted about at least one axis, and a laser light source (1), which generates the at least one light beam (2) depending on an angular position of the at least one micromirror.

7. The method of claim 6, wherein the at least one micromirror (7) is actuated with a frequency corresponding to a mechanical inherent frequency in a corresponding coordinate direction.

8. A headlight for motor vehicles, comprising:

at least one laser light source (1) which is configured to be modulated by an actuator (3) and a processing unit (4) and generates a laser beam (2) that is directed onto at least one light conversion element (8) via a beam deflection element (7) actuated by a beam deflection actuator (9), said at least one light conversion element having a phosphor for converting light, and a projection system (12) configured to project a light image (11) generated onto the at least one light conversion element and light distributions onto a roadway (13), wherein, in addition to changing the light distributions, the processing unit (4) is configured to change an intensity of the laser beam (2) of the at least one laser light source (1) by the actuator (3) according to a specified function for increasing the intensity in a direction of edges of the light image (11) generated on the light conversion element (8).

9. The headlight of claim 8, wherein the processing unit (4) is configured to send signals to the actuator (3) for multiplication of an actuation current ($I_s$) and therefore the laser beam intensity by coordinate-dependent correction factors comprising δ(x, y) or ε(x, y), wherein x and y comprise coordinate directions.

10. The headlight of claim 8, wherein for correction of an illumination falloff, the processing unit (4) is configured to multiply the intensity of the at least one laser beam by a reciprocal of a coordinate-dependent correction factor δ(x, y), wherein x and y comprise coordinate directions.

11. The headlight of claim 8, wherein, for correction of an illumination falloff on account of vignetting, the processing unit is configured to multiply the intensity of the at least one laser beam by a coordinate-dependent correction factor ε(x,y), wherein x and y comprise coordinate directions.

12. The headlight of claim 8, wherein the beam deflection element has at least one micromirror (7), which is configured to be pivoted about an axis, and a position signal ($p_r$) relating to an angular position of the at least one micromirror is fed to the processing unit (4) in order to modulate the at least one laser light source (1), which generates the at laser beam (2), depending on an angular position of the at least one micromirror.

13. The headlight of claim 12, wherein the beam deflection actuator (9) is designed to output at least one driver signal ($a_x$, $a_y$) to the at least one micromirror (7), of which a frequency corresponds to a mechanical inherent frequency of the at least one micromirror in a corresponding coordinate direction.

* * * * *